(12) United States Patent
Wang et al.

(10) Patent No.: US 11,087,623 B1
(45) Date of Patent: Aug. 10, 2021

(54) SYSTEMS AND METHODS FOR COMPENSATING FOR DRIVER SPEED-TRACKING ERROR

(71) Applicant: Toyota Motor Engineering & Manufacturing North America, Inc., Plano, TX (US)

(72) Inventors: Ziran Wang, Sunnyvale, CA (US); Kyungtae Han, Palo Alto, CA (US); Prashant Tiwari, Santa Clara, CA (US)

(73) Assignee: Toyota Motor Engineering & Manufacturing North America, Inc., Plano, TX (US)

( * ) Notice: Subject to any disclaimer, the term of this patent is extended or adjusted under 35 U.S.C. 154(b) by 3 days.

(21) Appl. No.: 16/775,772

(22) Filed: Jan. 29, 2020

(51) Int. Cl.
*G08G 1/0967* (2006.01)
*G06N 3/08* (2006.01)
*G06N 3/04* (2006.01)
*G08G 1/052* (2006.01)

(52) U.S. Cl.
CPC ......... *G08G 1/096775* (2013.01); *G06N 3/04* (2013.01); *G06N 3/08* (2013.01); *G08G 1/052* (2013.01)

(58) Field of Classification Search
CPC .... G08G 1/096775; G08G 1/052; G06N 3/04; G06N 3/08
See application file for complete search history.

(56) References Cited

U.S. PATENT DOCUMENTS

| | | | |
|---|---|---|---|
| 7,739,036 B2 * | 6/2010 | Grimm | G08G 1/09675 701/420 |
| 8,112,219 B2 * | 2/2012 | Johnson | G08G 1/0104 701/117 |
| 8,554,468 B1 * | 10/2013 | Bullock | B60W 50/0097 701/408 |

(Continued)

OTHER PUBLICATIONS

Battelle Memorial Institute and Texas A&M Transportation Institute, "Intelligent Network Flow Optimization (INFLO) Prototype Seattle Small-Scale Demonstration Report," May 15, 2015, FHWA-JPO-15-223, found at https://rosap.ntl.bts.gov/view/dot/3571 (in 109 pages).

(Continued)

*Primary Examiner* — Joseph H Feild
*Assistant Examiner* — Rufus C Point
(74) *Attorney, Agent, or Firm* — Christopher G. Darrow; Darrow Mustafa PC (57) ABSTRACT

Systems and methods for compensating for driver speed-tracking error are disclosed herein. One embodiment computes a recommended speed for a vehicle; classifies a driver of the vehicle as a particular type of driver among a plurality of driver types based on measured speed-tracking error, wherein the speed-tracking error is a difference between the recommended speed and an actual speed of the vehicle; predicts the speed-tracking error at a future time increment based on the speed-tracking error at one or more past time increments using a nonlinear autoregressive (NAR) neural network associated with the particular type of driver; com- (Continued)

putes a compensated recommended speed for the vehicle based on the recommended speed and the predicted speed-tracking error at the future time increment; and communicates the compensated recommended speed to the driver.

20 Claims, 7 Drawing Sheets

(56) References Cited

U.S. PATENT DOCUMENTS

| | | | |
|---|---|---|---|
| 9,827,853 B2 | 11/2017 | Tran et al. | |
| 10,037,696 B2 | 7/2018 | Laur et al. | |
| 10,319,230 B2* | 6/2019 | Abraham | G08G 1/096741 |
| 10,816,978 B1* | 10/2020 | Schwalb | G05D 1/0088 |
| 2007/0050110 A1* | 3/2007 | Kondoh | B60W 30/146 |
| | | | 701/36 |
| 2008/0021600 A1* | 1/2008 | Sohr | G08G 1/096791 |
| | | | 701/1 |
| 2011/0260886 A1 | 10/2011 | Nagura et al. | |
| 2014/0162219 A1* | 6/2014 | Stankoulov | B60W 50/14 |
| | | | 434/65 |
| 2014/0277835 A1* | 9/2014 | Filev | G06F 17/00 |
| | | | 701/2 |
| 2018/0178791 A1* | 6/2018 | Zhu | B60W 50/0097 |
| 2019/0077402 A1 | 3/2019 | Kim et al. | |
| 2019/0311616 A1 | 10/2019 | Jin et al. | |
| 2019/0375421 A1* | 12/2019 | Asher | H04W 4/027 |
| 2020/0114926 A1* | 4/2020 | Liu | B60W 50/0097 |

OTHER PUBLICATIONS

Zhao et al., "Integrated Traffic-Driving-Networking Simulator for the Design of Connected Vehicle Applications: Eco-Signal Case Study," Journal of Intelligent Transportation Systems, Jun. 2014, found at https://www.researchgate.net/profile/Yunjie_Zhao/publication/271937865_Integrated_Traffic-Driving-Networking_Simulator_for_the_Design_of_Connected_Vehicle_Applications_Eco-Signal_Case_Study/links/5644ff3408aef646e6cc0f2a.pdf (in 26 pages).
"Audi Expands Traffic Light Information with Speed Recommendations to Minimize Stops," IEEE, Feb. 19, 2019, found at https://site.ieee.org/connected-vehicles/2019/02/19/audi-expands-traffic-light-information-with-speed-recommendations-to-minimize-stops/ (in 3 pages).
Lu et al., "Eco-Driving at Signalized Intersections Based on Driving Behavior Self-Learning," 2018, Elsevier, found at https://reader.elsevier.com/reader/sd/pii/S2405896318325333?token=C0BB88DDC8362DDA9FB2F58445E88B1BB380A8F518B501D38328594D87208A735242756A65EF0A8AA4057F76F6D8B90C (in 6 pages).
Wu et al., "Deep Learning-Based Eco-Driving System for Battery Electric Vehicles," A Research Report from the National Center for Sustainable Transportation, May 2019, found at https://escholarship.org/content/qt9fz140zt/qt9fz140zt.pdf (in 38 pages).
Edelstein, "Audi's Traffic Light Information System Shows the Challenges Facing V2X Tech," Mar. 17, 2019, found at https://www.digitaltrends.com/cars/testing-audis-traffic-light-tech/ (in 12 pages).
"Connected Vehicles 102," U.S. Department of Transportation, date unknown, found at http://www.itsga.org/wp-content/uploads/2015/12/CV-102-Final_09162015-v2-1.pdf. (in 107 pages).
Dowling et al., "Performance Benefits of Connected Vehicles for Implementing Speed Harmonization," ISEHP 2016, International Symposium on Enhancing Highway Performance, found at https://reader.elsevier.com/reader/sd/pii/S2352146516305713?token=21885EC414401854C0109E11451E19A049C2F6081351ED5462512104BAA2D08F0CC56983C6E3188FB8FFE66E5D6A5B72 (in 12 pages).
Dowling Presentation, Jan. 9, 2017, 96th TRB Annual Meeting, found at https://path.berkeley.edu/sites/default/files/pre_01.09.2017_performancebenefits.pdf (in 15 pages).
"Speed Harmonization," U.S. Department of Transportation, Federal Highway Administration, Nov. 2014, found at https://www.fhwa.dot.gov/publications/research/operations/15012/15012.pdf (in 1 page).
Impacts Assessment of Dynamic Speed Harmonization with Queue Warning, Kittelson & Associates, Inc., Jun. 2015, found at https://www.google.com/url?sa=t&rct=j&q=&esrc=s&source=web&cd=4&ved=2ahUKEwjzwYyBp7jlAhUT7J4KHV3-CtgQ9ADegQlARAB&url=https%3A%2F%2Frosap.ntl.bts.gov%2Fview%2Fdot%2F3554%2Fdot_3554_DS1.pdf%3F&usg=AOvVaw0npl1byWVCXT2XT4ZA4Rly (in 140 pages).
Ma et al., "Freeway Speed Harmonization," Jan. 2016, found at https://www.researchgate.net/publication/299997308_Freeway_Speed_Harmonization/link/5d5e83454585152102583835/download (in 14 pages).
"Report on Dynamic Speed Harmonization and Queue Warning Algorithm Design," U.S. Department of Transportation, Feb. 28, 2014, found at https://www.google.com/url?sa=t&rct=j&q=&esrc=s&source=web&cd=6&ved=2ahUKEwjR3unG-7flAhVCqZ4KHVvZDDsQFjAFegQlBBAC&url=https%3A%2F%2Frosap.ntl.bts.gov%2Fview%2Fdot%2F3534%2Fdot_3534_DS1.pdf%3F&usg=AOvVaw2AW3sGBoWskehNy0q48Q-R (in 79 pages).
Xia, "Eco-Approach and Departure Techniques for Connected Vehicles at Signalized Traffic Intersections," doctoral dissertation, Jun. 2014, found at https://escholarship.org/content/qt5xz408r4/qt5xz408r4.pdf (in 184 pages).
Xia, "Development and Evaluation of an Enhanced Eco-Approach Traffic Signal Application for Connected Vehicles," 16th International IEEE Conference on Intelligent Transportation Systems (ITSC 2013), found at https://www.researchgate.net/profile/Guoyuan_Wu/publication/269332330_Development_and_evaluation_of_an_enhanced_eco-approach_traffic_signal_application_for_Connected_Vehicles/links/557ed45508aec87640ddead3.pdf (in 6 pages).

* cited by examiner

SYSTEMS AND METHODS FOR COMPENSATING FOR DRIVER SPEED-TRACKING ERROR

TECHNICAL FIELD

The subject matter described herein generally relates to vehicles and, more particularly, to systems and methods for compensating for driver speed-tracking error.

BACKGROUND

For a variety of reasons, including promoting smoother flow of traffic and fuel-efficient eco-driving, applications arise in which a driver is provided with a recommended speed. Regardless of how diligently a driver strives to track (follow) the recommended speed, at least some speed-tracking error inevitably results. For example, the driver may overshoot or undershoot the recommended speed at least some of the time. This speed-tracking error diminishes the benefits that would otherwise be gained by providing the driver with a recommended speed.

SUMMARY

An example of a system for compensating for driver speed-tracking error is presented herein. The system comprises one or more processors and a memory communicably coupled to the one or more processors. The memory stores a motion control module including instructions that when executed by the one or more processors cause the one or more processors to compute a recommended speed for a vehicle. The memory also stores a driver-classification module including instructions that when executed by the one or more processors cause the one or more processors to classify a driver of the vehicle as a particular type of driver among a plurality of driver types based on measured speed-tracking error, wherein the speed-tracking error is a difference between the recommended speed and an actual speed of the vehicle. The memory also stores a speed-tracking-error prediction and compensation module including instructions that when executed by the one or more processors cause the one or more processors to predict the speed-tracking error at a future time increment based on the speed-tracking error at one or more past time increments using a nonlinear autoregressive (NAR) neural network associated with the particular type of driver. The speed-tracking-error prediction and compensation module also includes instructions that when executed by the one or more processors cause the one or more processors to compute a compensated recommended speed for the vehicle based on the recommended speed and the predicted speed-tracking error at the future time increment. The memory also stores a human-machine interface (HMI) module including instructions that when executed by the one or more processors cause the one or more processors to communicate the compensated recommended speed to the driver.

Another embodiment is a non-transitory computer-readable medium for compensating for driver speed-tracking error and storing instructions that when executed by one or more processors cause the one or more processors to compute a recommended speed for a vehicle. The instructions also cause the one or more processors to classify a driver of the vehicle as a particular type of driver among a plurality of driver types based on measured speed-tracking error, wherein the speed-tracking error is a difference between the recommended speed and an actual speed of the vehicle. The instructions also cause the one or more processors to predict the speed-tracking error at a future time increment based on the speed-tracking error at one or more past time increments using a nonlinear autoregressive (NAR) neural network associated with the particular type of driver. The instructions also cause the one or more processors to compute a compensated recommended speed for the vehicle based on the recommended speed and the predicted speed-tracking error at the future time increment. The instructions also cause the one or more processors to communicate the compensated recommended speed to the driver.

Another embodiment is a method of compensating for driver speed-tracking error. The method includes computing a recommended speed for a vehicle. The method also includes classifying a driver of the vehicle as a particular type of driver among a plurality of driver types based on measured speed-tracking error, wherein the speed-tracking error is a difference between the recommended speed and an actual speed of the vehicle. The method also includes predicting the speed-tracking error at a future time increment based on the speed-tracking error at one or more past time increments using a nonlinear autoregressive (NAR) neural network associated with the particular type of driver. The method also includes computing a compensated recommended speed for the vehicle based on the recommended speed and the predicted speed-tracking error at the future time increment. The method also includes communicating the compensated recommended speed to the driver.

BRIEF DESCRIPTION OF THE DRAWINGS

So that the manner in which the above-recited features of the present disclosure can be understood in detail, a more particular description of the disclosure, briefly summarized above, may be had by reference to the implementations, some of which are illustrated in the appended drawings. It is to be noted, however, that the appended drawings illustrate only possible implementations of this disclosure and are therefore not to be considered limiting of its scope. The disclosure may admit to other implementations.

To facilitate understanding, identical reference numerals have been used, wherever possible, to designate identical elements that are common to the figures. Additionally, elements of one or more embodiments may be advantageously adapted for utilization in other embodiments described herein.

DETAILED DESCRIPTION

In various embodiments described herein, a machine-learning-based approach is used to model driver behavior in tracking a recommended speed, and the speed-tracking error is predicted and compensated for in real time for a particular driver in a customized way.

In some embodiments, in a training phase, a system that compensates for driver speed-tracking error clusters historical speed-tracking-error data from a plurality of drivers into a plurality of driver types (e.g., based on how accurately the drivers track a recommended speed). The system can identify one or more principal variables in the clustered historical speed-tracking-error data and train, for each driver type in the plurality of driver types, a corresponding NAR neural network using the clustered historical speed-tracking-error data and the one or more identified principal variables. In some embodiments, a different type of neural network may be employed.

In some embodiments, in learning and calculation phases, the system computes a recommended speed for a vehicle. The system also classifies a driver of the vehicle as a particular type of driver among the plurality of driver types mentioned above based on the driver's measured speed-tracking error. In this context, the speed-tracking error is the difference between the recommended speed and the actual speed of the vehicle. The system predicts the speed-tracking error at a future time increment based on the speed-tracking error at one or more past time increments using a nonlinear autoregressive (NAR) neural network (or other neural network) associated with the particular type of driver into which the driver of the vehicle has been classified. The system can then compute a compensated recommended speed for the vehicle based on the recommended speed and the predicted speed-tracking error at the future time increment. The system communicates this compensated recommended speed to the driver. In some embodiments, the compensated recommended speed is communicated to the driver via a visual display (e.g., a display that shows the vehicle's actual speed and the compensated recommended speed side by side). In other embodiments, the compensated recommended speed can be communicated to the driver audibly (e.g., "Recommended speed is 38 miles per hour") via an in-vehicle sound system. In still other embodiments, the compensated recommended speed is communicated to the driver both visually and audibly.

In some embodiments, the system computes the recommended speed for the vehicle based, at least in part, on information the system receives from other vehicles via vehicle-to-vehicle (V2V) communication, from a traffic information server, or both.

Figure 1:
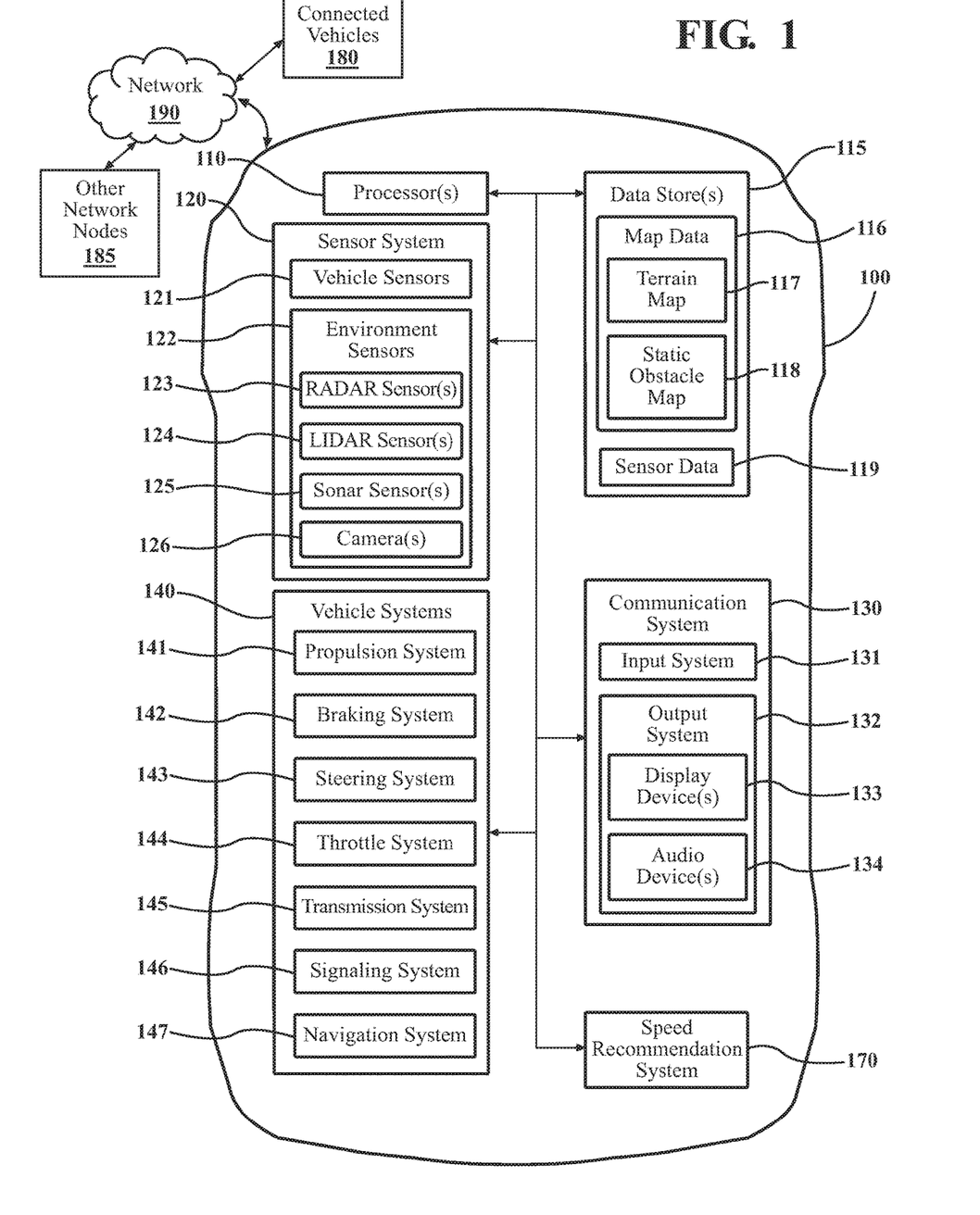
FIG. 1 illustrates one embodiment of a vehicle within which systems and methods disclosed herein may be implemented.

Referring to FIG. 1, an example of a vehicle 100, in which systems and methods disclosed herein can be implemented, is illustrated. The vehicle 100 can include a speed recommendation system 170 or components and/or modules thereof. As used herein, a "vehicle" is any form of motorized transport. In one or more implementations, the vehicle 100 can be an automobile. In some implementations, the vehicle 100 may be any other form of motorized transport. The vehicle 100 can include the speed recommendation system 170 or capabilities to support or interact with the speed recommendation system 170 and thus benefits from the functionality discussed herein. While arrangements will be described herein with respect to automobiles, it will be understood that implementations are not limited to automobiles. Instead, implementations of the principles discussed herein can be applied to any kind of vehicle, as discussed above. Instances of vehicle 100, as used herein, are equally applicable to any device capable of incorporating the systems or methods described herein.

The vehicle 100 also includes various elements. It will be understood that, in various implementations, it may not be necessary for the vehicle 100 to have all of the elements shown in FIG. 1. The vehicle 100 can have any combination of the various elements shown in FIG. 1. Further, the vehicle 100 can have additional elements to those shown in FIG. 1. In some arrangements, the vehicle 100 may be implemented without one or more of the elements shown in FIG. 1, including speed recommendation system 170. While the various elements are shown as being located within the vehicle 100 in FIG. 1, it will be understood that one or more of these elements can be located external to the vehicle 100 or be part of a system that is separate from vehicle 100. Further, the elements shown may be physically separated by large distances.

As shown in FIG. 1, vehicle 100 may communicate with one or more other connected vehicles 180 via a network 190. Also, in some embodiments, as shown in FIG. 1, vehicle 100 may communicate with other network nodes 185 such as users' mobile devices, cloud servers (e.g., traffic-information servers), and roadside units (RSUs) or other infrastructure such as traffic signals via network 190.

In FIG. 1, network 190 represents any of a variety of wired and wireless networks. For example, in communicating directly with another vehicle, sometimes referred to as vehicle-to-vehicle (V2V) communication, vehicle 100 can employ a technology such as dedicated short-range communication (DSRC) or Bluetooth Low Energy (BLE). In communicating with a user's mobile device (e.g., a smartphone) or a remote server, vehicle 100 can use a technology such as cellular data. In some embodiments, network 190 includes the Internet.

Some of the possible elements of the vehicle 100 are shown in FIG. 1 and will be described in connection with subsequent figures. However, a description of many of the elements in FIG. 1 will be provided after the discussion of FIGS. 2-5 for purposes of brevity of this description. Additionally, it will be appreciated that for simplicity and clarity of illustration, where appropriate, reference numerals have been repeated among the different figures to indicate corresponding or analogous elements. In addition, the discussion outlines numerous specific details to provide a thorough understanding of the embodiments described herein. Those skilled in the art, however, will understand that the embodiments described herein may be practiced using various combinations of these elements.

Figure 2:
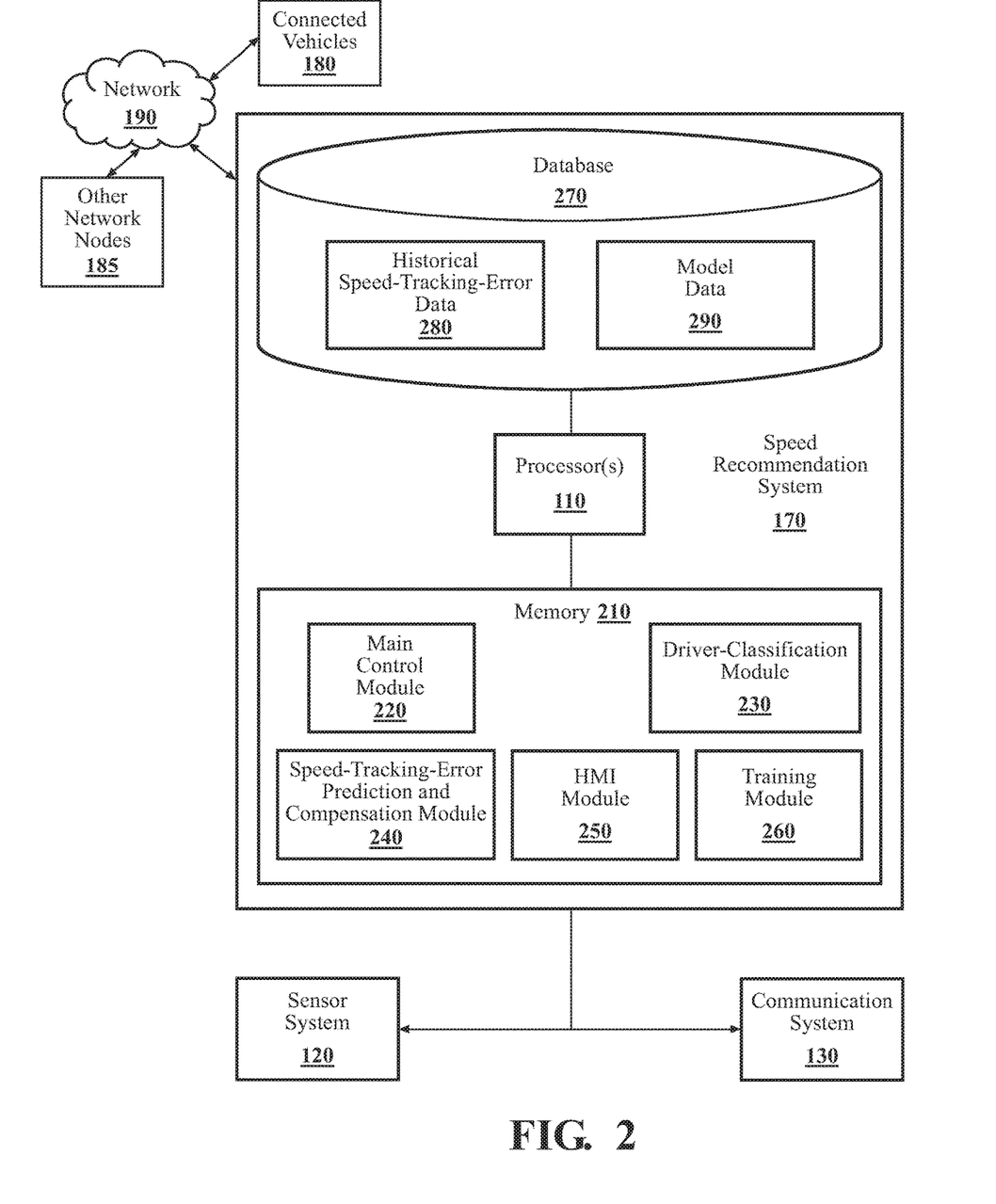
FIG. 2 illustrates one embodiment of a speed recommendation system.

The speed recommendation system 170 is shown as including one or more processors 110 from the vehicle 100 of FIG. 1. Accordingly, the one or more processors 110 may be a part of the speed recommendation system 170, the speed recommendation system 170 may include a separate processor from the one or more processors 110 of the vehicle 100, or the speed recommendation system 170 may access the one or more processors 110 through a data bus or another communication path. In one embodiment, the speed recommendation system 170 includes a memory 210 that stores a motion control module 220, a driver-classification module 230, a speed-tracking-error prediction and compensation module 240, a human-machine interface (HMI) module 250, and a training module 260. The memory 210 is a random-access memory (RAM), read-only memory (ROM), a hard-disk drive, a flash memory, or other suitable memory for storing the modules 220, 230, 240, 250, and 260. The modules 220, 230, 240, 250, and 260 are, for example, computer-readable instructions that when executed by the one or more processors 110, cause the one or more processors 110 to perform the various functions disclosed herein. In performing functions such training a set of nonlinear autoregressive (NAR) neural networks and various computational tasks, the modules of speed recommendation system 170 may store historical speed-tracking-error data 280 and various kinds of model data 290 in a database 270.

As shown in FIG. 2, speed recommendation system 170 can communicate with one or more connected vehicles 180 and with other network nodes 185 via network 190. In some embodiments, speed recommendation system 170 communicates with one or more connected vehicles 180 via V2V connections, as discussed above. In some embodiments, speed recommendation system 170 communicates with one or more other network nodes 185 (e.g., users' mobile devices, traffic-information servers, RSUs, other infrastructure systems, etc.) via a cellular-data connection, as discussed above. In some embodiments, speed recommendation system 170 may communicate with other systems or subsystems of vehicle 100 such as sensor system 120 and communication system 130.

The description of speed recommendation system 170 that follows is divided into three sections corresponding to (1) a training phase in which a set of NAR neural networks are trained using historical speed-tracking-error data 280, (2) a learning phase in which a driver of a vehicle 100 is classified, in real time, as a particular type of driver—one of n driver types, and (3) a calculation phase in which the speed-tracking error at a future time increment is predicted and a compensated recommended speed is calculated and communicated to the driver. These three phases are diagrammed in, respectively, FIGS. 3A, 3B, and 3C.

Referring to FIG. 2, training module 260 generally includes instructions that cause the one or more processors 110 to cluster historical speed-tracking-error data 280 from a plurality of drivers into a plurality of driver types, identify one or more principal variables in the clustered historical speed-tracking-error data, and train, for each driver type in the plurality of driver types, a corresponding NAR neural network using the clustered historical speed-tracking-error data and the one or more principal variables. In some embodiments, a different type of neural network may be employed. These functions are discussed in greater detail in connection with FIG. 3A.

Figure 3A:
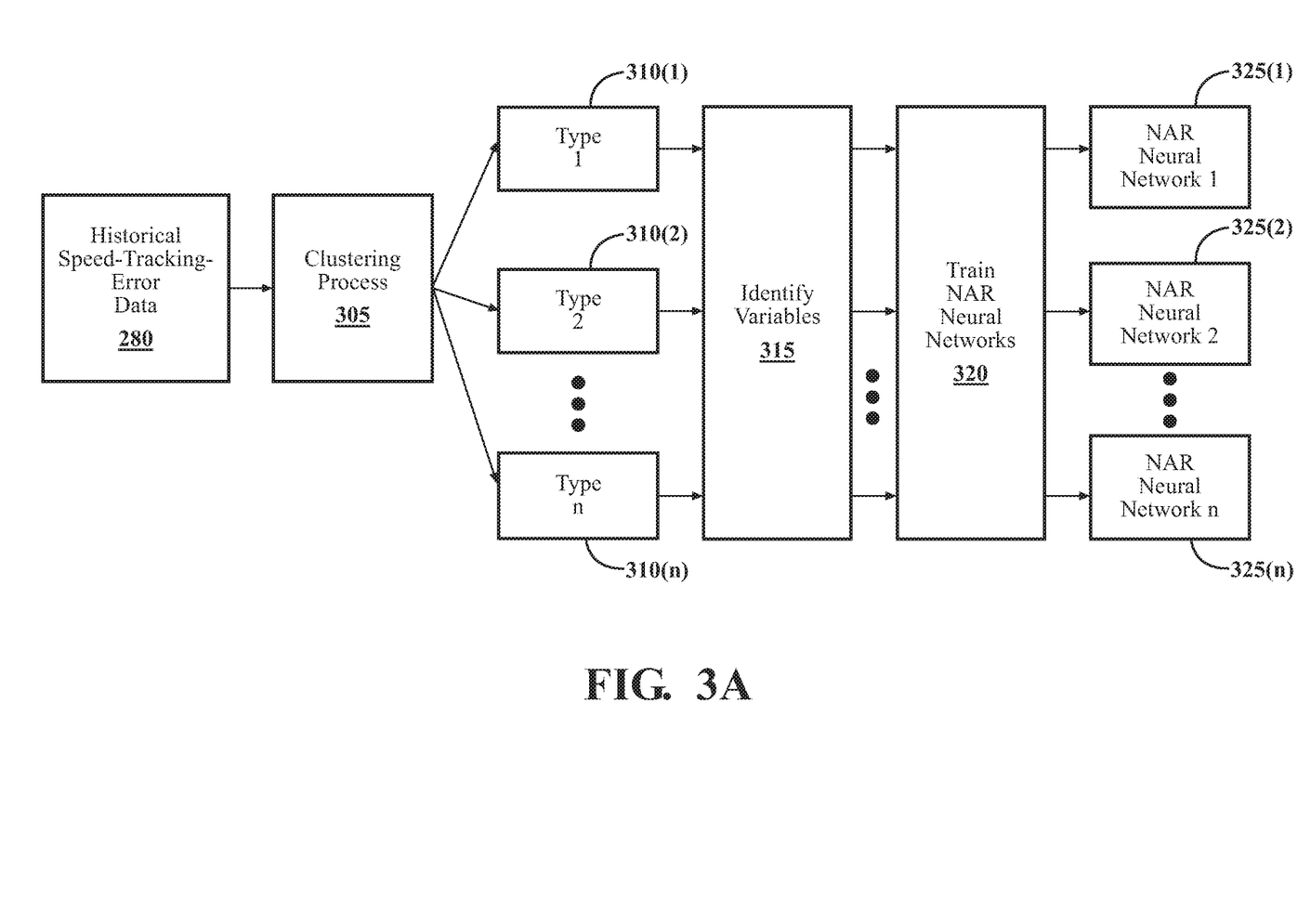
FIG. 3A is a block diagram of a training phase of a speed recommendation system, in accordance with an illustrative embodiment of the invention.

FIG. 3A is a block diagram of a training phase of speed recommendation system 170, in accordance with an illustrative embodiment of the invention. In FIG. 3A, training module 260 performs a clustering process 305 on historical speed-tracking-error data 280 gathered from a plurality of drivers. In some embodiments, training module 260 employs hierarchical cluster analysis (HCA) in clustering the historical speed-tracking-error data 280. In other embodiments, a different clustering algorithm is employed. During clustering process 305, training module 260 clusters the historical speed-tracking-error data 280 into n driver types 310(1), 310(2), . . . 310(n). In one embodiment, the plurality of driver types 310(1)-(n) correspond to varying degrees of accuracy in tracking a recommended speed. For example, in one embodiment, Driver Type 1 (driver type 310(1) in FIG. 3A) corresponds to a type of driver who tracks a recommended speed the most accurately among the population of sampled drivers. The other driver types correspond to drivers who track a recommended speed less accurately, with Driver Type n (driver type 310(n) in FIG. 3A) being a type of driver who tracks a recommended speed the least accurately among the population of sampled drivers. The numbering scheme for the various driver types is arbitrary, however, and can differ, depending on the embodiment.

Referring to Element 315 in FIG. 3A, training module 260 also includes instructions that cause the one or more processors 110 to identify one or more principal variables in the clustered historical speed-tracking-error data. In one embodiment, training module 260 uses a technique known as principal component analysis (PCA) to identify the one or more principal variables. In other embodiments, a different variable-identification technique can be employed. The one or more identified principal variables are fed to a process (Element 320 in FIG. 3) in which training module 260 trains n different NAR neural networks, each NAR neural network 325(i), i=1, 2, . . . , n, corresponding to a specific one of the n driver types 310(1)-(n). In other words, NAR neural network 325(1) corresponds to driver type 310(1), NAR neural network 325(2) corresponds to driver type 310(2), etc., and NAR neural network 325(n) corresponds to driver type 310(n). The trained neural networks 325(1)-(n) are deployed in the learning and calculation phases that are described further below. As mentioned above, in some embodiments, a different type of neural network may be employed.

In some embodiments, training module 260 is not part of speed recommendation system 170 but is, instead, part of a separate off-line training system that is separate from vehicle 100. For example, such a separate off-line training system might be associated with a research center or vehicle manufacturer's research and development operations.

Referring again to FIG. 2, driver-classification module 230 generally includes instructions that cause the one or more processors 110 to classify a driver of a vehicle 100 as a particular type of driver among a plurality of driver types (see driver types 310(1)-(n) in FIG. 3A) based on the driver's measured driver speed-tracking error 330. In one embodiment, the speed-tracking error is defined as the difference $(S_R-S_A)$ between the recommended speed and an actual speed of vehicle 100, where $S_R$ denotes the recommended speed, and $S_A$ denotes the actual speed, of vehicle 100. These functions are discussed in greater detail in connection with FIG. 3B.

Figure 3B:
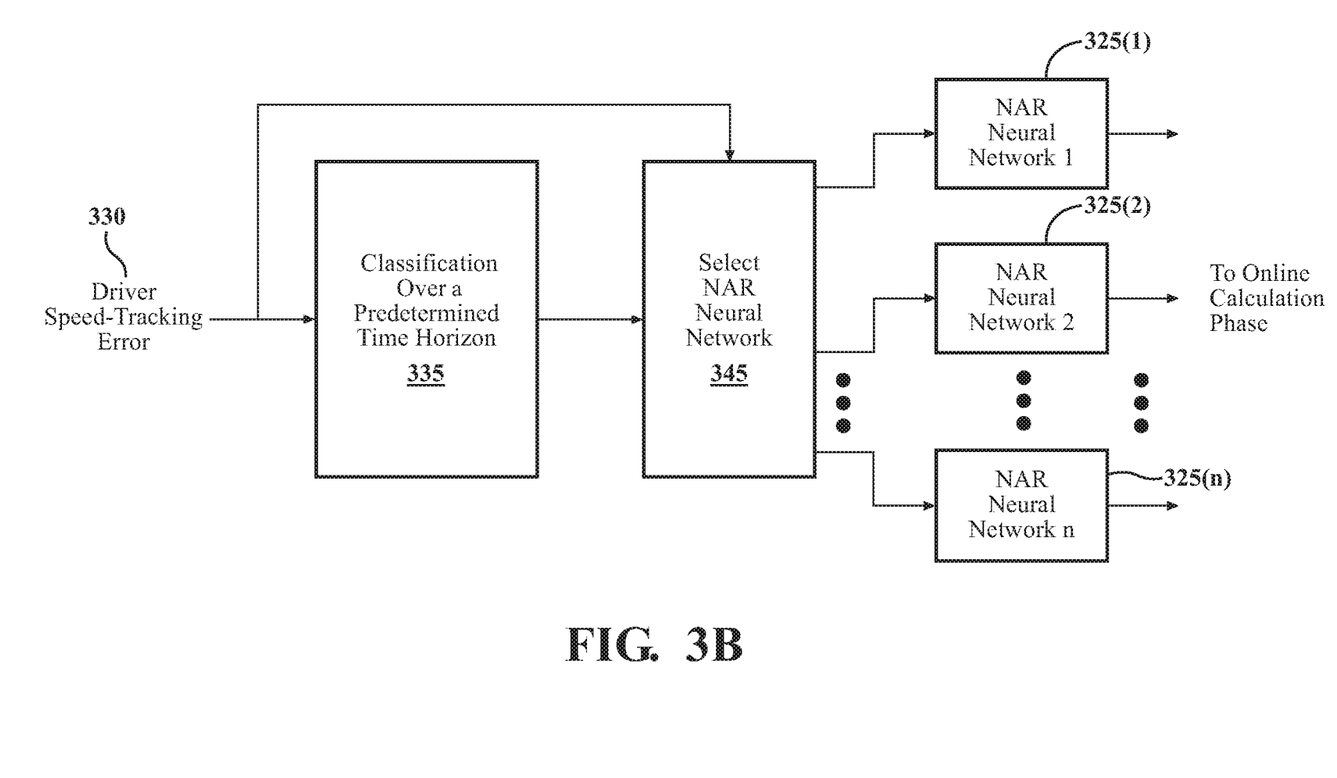
FIG. 3B is a block diagram of a learning phase of a speed recommendation system, in accordance with an illustrative embodiment of the invention.

FIG. 3B is a block diagram of a learning phase of a speed recommendation system 170, in accordance with an illustrative embodiment of the invention. Though this phase of speed recommendation system 170 is herein referred to as a "learning" phase, it is distinct from the "training" phase described above in that it coincides with real-time deployment, in a vehicle 100, of the speed-tracking-error-compensation aspects of speed recommendation system 170. Therefore, it may be termed an "on-line learning phase" (as opposed to an "off-line training phase"). In FIG. 3B, driver-classification module 230 classifies the driver of a vehicle 100 based on the driver speed-tracking error 330 over a predetermined time horizon (Element 335 in FIG. 3B). The result is a classification of the driver as one of the n driver types, 310(1)-(n), discussed above in connection with FIG. 3A (driver-type classification 340 in FIG. 3B). For example, in one embodiment, driver-classification module 230 performs k-NN (k-nearest-neighbor) classification over a time horizon of a few time increments' worth of driver speed-tracking error data 330. The duration of a time increment can vary, depending on the embodiment, (e.g., 0.1 s, 0.5 s, 1 s, etc.). In some embodiments, the driver-type classification 340 is updated every five minutes or another predetermined interval. That is, a particular driver can be classified differently over time depending on how the driver's speed-tracking error 330 profile changes. A driver's speed-tracking error 330 can change due to factors such as fatigue, level of attentiveness, traffic density, environmental conditions (condition of the roadway, weather, time of day, etc.), and the driver's mood/emotions.

In some embodiments, a driver's driver-type classification 340 can be saved for later use by speed recommendation system 170. In some embodiments, speed recommendation system 170 determines the identity of the driver of vehicle 100 through facial images, biometrics, identifying an associated mobile device, or other techniques and automatically loads into memory 210 a profile for that particular driver that includes the driver's usual or default driver-type classification 340 as a starting point.

Speed-tracking-error prediction and compensation module 240 (discussed more fully below), based on the driver's driver-type classification 340 output by driver-classification module 230, selects the NAR neural network 325(i) corresponding to the driver type 310(i) into which the driver of vehicle 100 has been classified. The driver speed-tracking error 330 is routed to the selected NAR neural network 325(i) for as long as the corresponding driver type 310(i) remains in effect (e.g., until the driver's speed-tracking-error classification is updated to a different driver type 310). The output of the selected NAR neural network 325(i) is discussed below in connection with the calculation phase of speed recommendation system 170.

Referring again to FIG. 2, speed-tracking-error prediction and compensation module 240 generally includes instructions that cause the one or more processors 110 to predict the speed-tracking error at a future time increment based on the speed-tracking error at one or more past time increments using the NAR neural network 325(i) associated with the driver type 310(i) into which the driver of vehicle 100 has been classified (refer to Element 335 in FIG. 3B). Speed-tracking-error prediction and compensation module 240 also includes instructions to compute a compensated recommended speed for the vehicle based on the recommended speed $S_R$ and the predicted speed-tracking error at the future time increment. This is part of the calculation phase of speed recommendation system 170 discussed below in connection with FIG. 3C.

Motion control module 220 generally includes instructions that cause the one or more processors 110 to compute a recommended speed for a vehicle. In some embodiments, motion control module 220 relies on sensor data 119 from sensor system 120 (images, LIDAR, radar, etc.) to compute the recommended speed. In other embodiments, motion control module 220 includes instructions to compute the recommended speed for the vehicle 100 based, at least in part, on information received from one or more traffic-information servers, one or more other vehicles (e.g., via V2V communication), or both. The functions performed by motion control module 220 and speed-tracking-error prediction and compensation module 240 are discussed further below in connection with FIG. 3C.

Figure 3C:
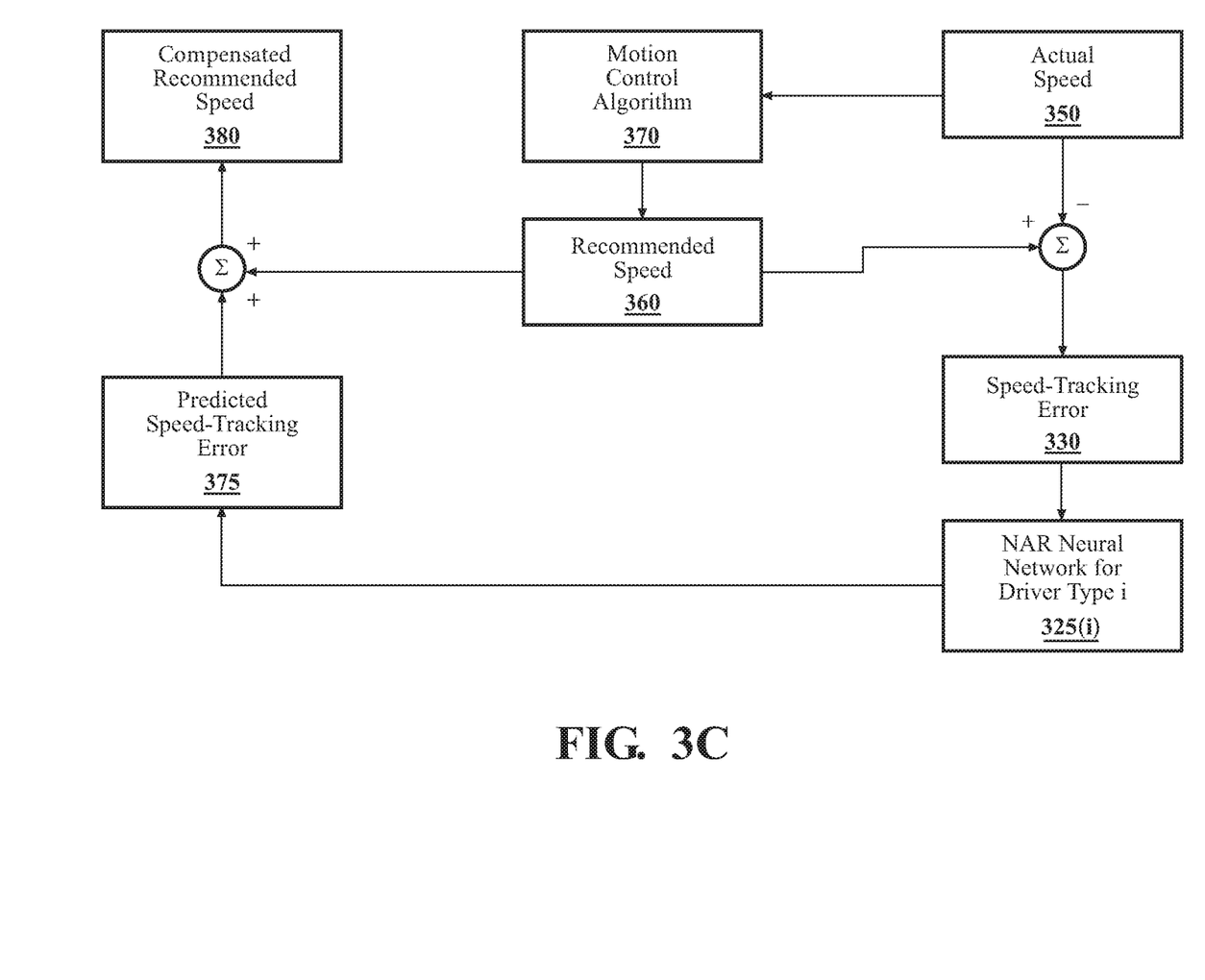
FIG. 3C is a block diagram of a calculation phase of a speed recommendation system, in accordance with an illustrative embodiment of the invention.

FIG. 3C is a block diagram of a calculation phase of speed recommendation system 170, in accordance with an illustrative embodiment of the invention. This phase may also be termed an "on-line calculation phase," since speed recommendation system 170, in this phase, can predict and compensate for speed-tracking error in real time. In FIG. 3C, a motion control algorithm 370 associated with motion control module 220 computes a recommended speed 360, as discussed above. Motion control module 220 obtains the actual speed 350 of vehicle 100 from, for example, the Controller Area Network (CAN bus) of vehicle 100 and inputs the actual speed 350 to the motion control algorithm 370. Speed-tracking-error prediction and compensation module 240 subtracts the actual speed 350 from the recommended speed 360 to obtain the driver speed-tracking error 330. Speed-tracking-error prediction and compensation module 240 inputs the driver speed-tracking error 330 to the NAR neural network 325(i) corresponding to the driver type 310(i) into which the driver of vehicle 100 has been classified, as discussed above in connection with FIG. 3B. The NAR neural network 325(i) outputs a predicted speed-tracking error 375. In the embodiment shown in FIG. 3C, speed-tracking-error prediction and compensation module 240 adds the predicted speed-tracking error 375 to the recommended speed 360 to compute the compensated recommended speed 380.

Referring again to FIG. 2, HMI module 250 generally includes instructions that cause the one or more processors 110 to communicate the compensated recommended speed 380 (see FIG. 3C) to the driver of a vehicle 100. Communicating the compensated recommended speed 380 to the driver can take different forms, depending on the particular embodiment. In one embodiment, HMI module 250 outputs the compensated recommended speed 380 to a display device 133 in communication system 130. In other embodiments, HMI module 250 outputs the compensated recommended speed 380 to a mobile communication device (e.g., a smartphone) associated with the driver or other occupant of vehicle 100 (see other network nodes 185 in FIGS. 1 and 2). For example, in some embodiments, the driver mounts a smartphone on the dashboard of vehicle 100, and HMI module 250 communicates with the smartphone via Bluetooth or another type of network connection to output the compensated recommended speed 380, which is frequently updated (re-calculated) by speed-tracking-error prediction and compensation module 240 in real time (refer to FIG. 3C). In some embodiments, HMI module 250 also includes instructions to display the actual speed 350 of vehicle 100 (e.g., next to the compensated recommended speed 380).

In other embodiments, HMI module 250 communicates the compensated recommended speed 380 to the driver audibly. For example, HMI module 250 can interface with audio device(s) 134 of communication system 130 to output pre-recorded or computer-synthesized speech such as, "Recommended speed is 41 miles per hour." In some embodiments, audible indication of the compensated recommended speed 380 is combined with a visual indication on a display device 133.

Figure 4:
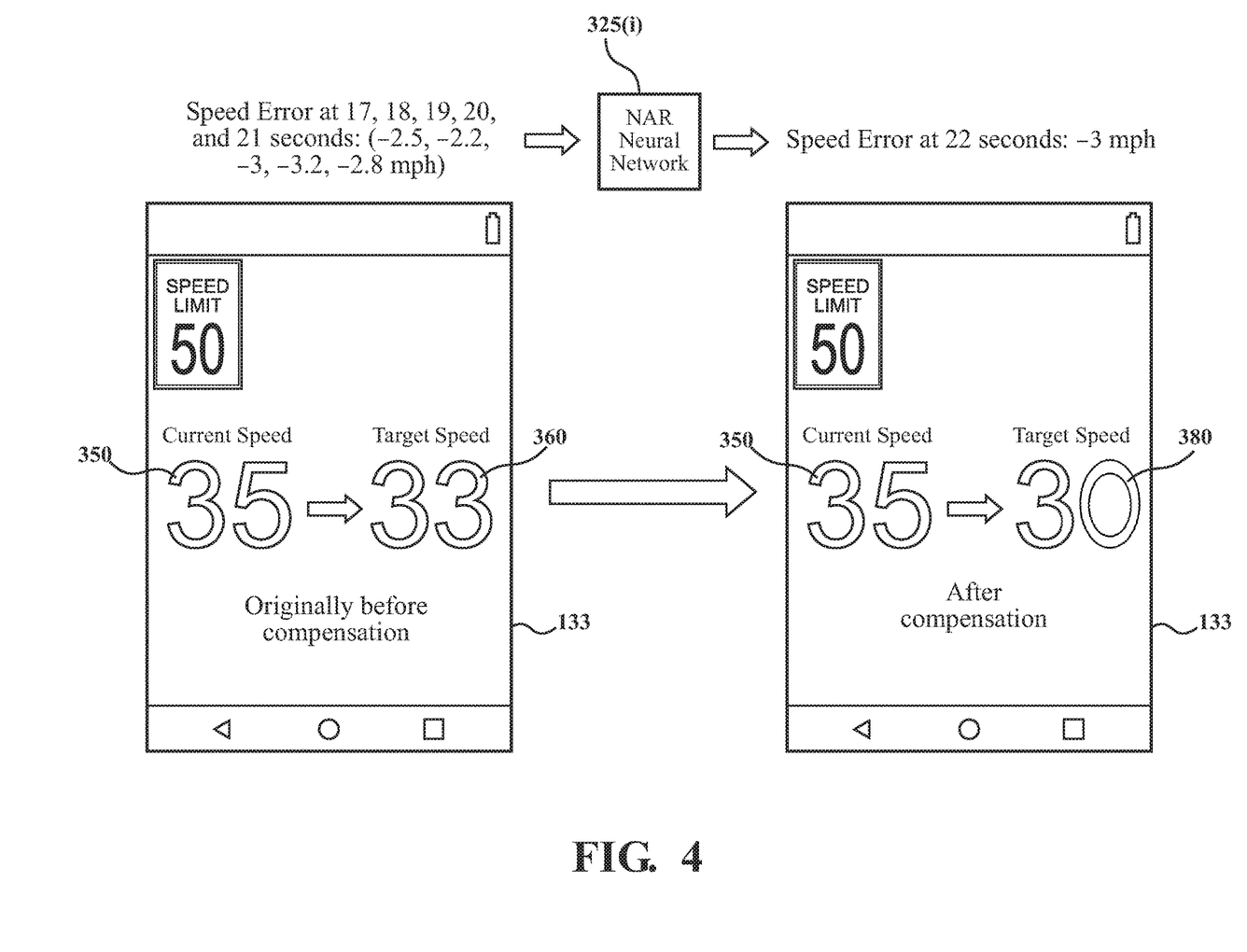
FIG. 4 illustrates an example of compensating for driver speed-tracking error, in accordance with an illustrative embodiment of the invention.

FIG. 4 illustrates an example of compensating for driver speed-tracking error 330, in accordance with an illustrative embodiment of the invention. The left side of FIG. 4, for contrast, illustrates the case of no compensation for driver speed-tracking error 330. In this case, the actual speed 350 (35 mph) and the recommended speed 360 (33 mph, labeled "Target Speed" in FIG. 4) are shown on display device 133. The driver speed-tracking error 330 (−2.5, −2.2, −3.0, −3.2, and −2.8 mph) at the past discrete-time increments 17, 18, 19, 20, and 21 seconds, respectively, is input to the NAR neural network 325(i) corresponding to the driver type 310(i) into which the driver has been classified by driver-classification module 230. Note that, in accordance with the definition of speed-tracking error 330, as discussed above and as shown in FIG. 3C, the past speed-tracking error values are negative, in this example. Discrete time increments of one second are shown in FIG. 4 for simplicity. In some embodiments, the discrete time increments are smaller than one second.

The right side of FIG. 4 illustrates the case of compensation by speed-tracking-error prediction and compensation module 240, as discussed above. In this example, the NAR neural network 325($i$) predicts a driver speed-tracking error 330 of −3 mph at discrete-time increment 22 seconds (the next discrete-time increment). This represents an overshoot of 3 mph by the driver. Speed-tracking-error prediction and compensation module 240 computes a compensated recommended speed 380 of 30 mph by adding the predicted speed-tracking error 375 (−3 mph) to the recommended speed 360 (33 mph). When the driver, who is currently tending to overshoot by 3.0 mph attempts to track the compensated recommended speed 380 of 30 mph, vehicle 100 will end up traveling at a speed at or close to the recommended speed 360 of 33 mph. Over time, vehicle 100 will travel at a speed that more closely tracks the recommended speed 360 due to the frequently updated compensation described herein. Note that, in the example of FIG. 4, the recommended speed 360 remains 33 mph and is stored internally by speed recommendation system 170, but that value is not communicated to the driver. Instead, the compensated recommended speed 380 (30 mph) is communicated to the driver of vehicle 100.

Figure 5:
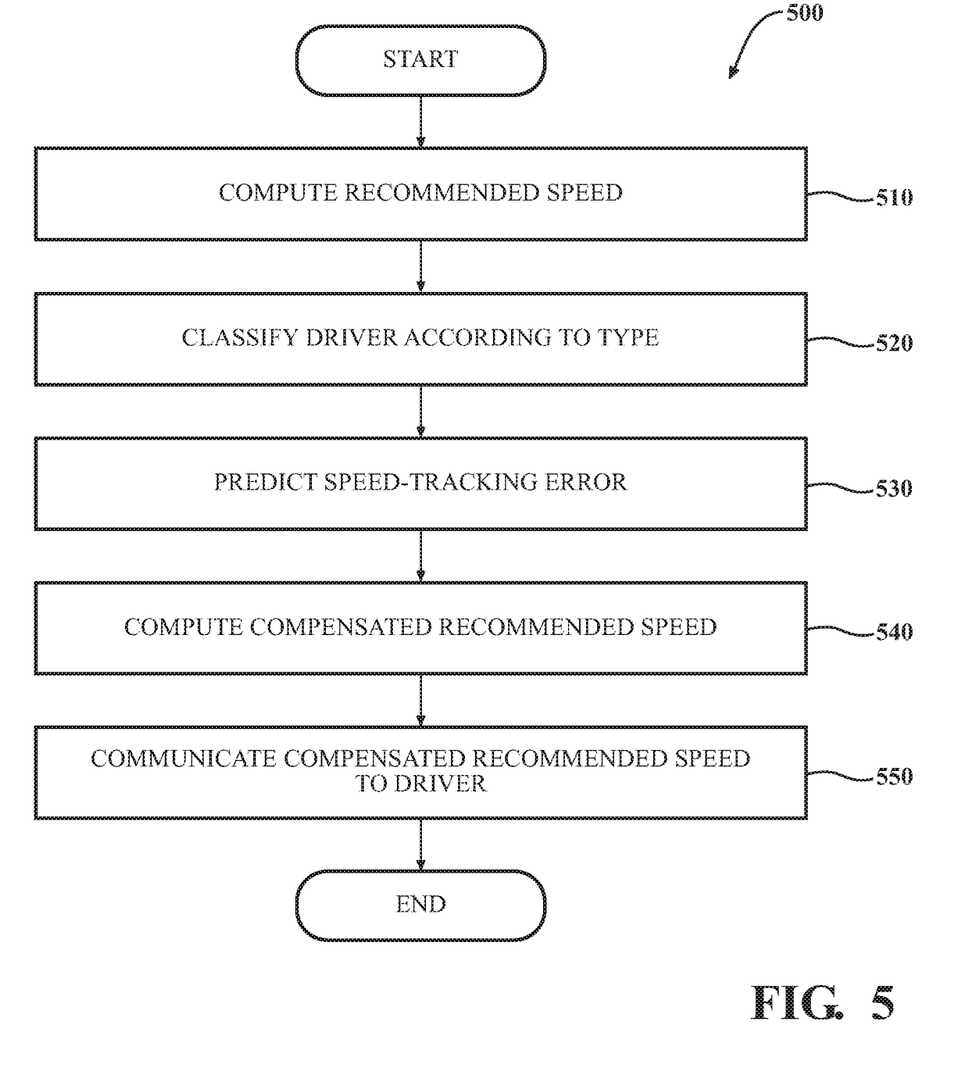
FIG. 5 is a flowchart of a method of compensating for driver speed-tracking error, in accordance with an illustrative embodiment of the invention.

FIG. 5 is a flowchart of a method 500 of compensating for driver speed-tracking error 330, in accordance with an illustrative embodiment of the invention. Method 500 will be discussed from the perspective of the speed recommendation system 170 shown in FIG. 2 with further reference to FIGS. 3A-3C. While method 500 is discussed in combination with speed recommendation system 170, it should be appreciated that method 500 is not limited to being implemented within speed recommendation system 170, but speed recommendation system 170 is instead one example of a system that may implement method 500.

At block 510, motion control module 220 computes a recommended speed 360 for a vehicle 100. As discussed above, in some embodiments, motion control module 220 relies on sensor data 119 from sensor system 120 (images, LIDAR, radar, etc.) to compute the recommended speed. In other embodiments, motion control module 220 includes instructions to compute the recommended speed for the vehicle 100 based, at least in part, on information received from one or more traffic-information servers, one or more other vehicles (e.g., via V2V communication), or both.

At block 520, driver-classification module 230 classifies the driver of vehicle 100 as a particular type of driver 310($i$) among a plurality of driver types, 310(1), 310(2), . . . , 310($n$), based on the driver's measured speed-tracking error 330. As discussed above, in some embodiments, the speed-tracking error is the difference ($S_R$−$S_A$) between the recommended speed and the actual speed of the vehicle 100. As also discussed above, in one embodiment, the plurality of driver types 310(1)-($n$) correspond to varying degrees of accuracy in tracking a recommended speed.

At block 530, speed-tracking-error prediction and compensation module 240 predicts the driver speed-tracking error 330 at a future time increment based on the speed-tracking error 330 at one or more past time increments using a NAR neural network 325($i$) associated with the particular type of driver 310($i$) into which the driver has been classified by driver-classification module 230.

At block 540, speed-tracking-error prediction and compensation module 240 computes a compensated recommended speed 380 for the vehicle 100 based on the recommended speed 360 and the predicted speed-tracking error 375 at the future time increment. As discussed above, in one embodiment, the compensated recommended speed 380 is computed by adding the recommended speed 360 to the predicted speed-tracking error 375.

At block 550, HMI module 250 communicates the compensated recommended speed 380 to the driver of vehicle 100. As discussed above, HMI module 250 can communicate the compensated recommended speed 380 to the driver via a display device 133 that is integrated with vehicle 100 or via a vehicle occupant's mobile device (e.g., a smartphone). In other embodiments, HMI module 250 communicates the compensated recommended speed 380 to the driver audibly. In still other embodiments, HMI module 250 communicates compensated recommended speed 380 to the driver both visually and audibly. As mentioned above, in some embodiments, HMI module 250 also communicates (e.g., displays) the actual speed 350 of the vehicle 100 to the driver, in addition to the compensated recommended speed 380.

In some embodiments, method 500 includes additional actions (not shown in FIG. 5) that are part of the training phase of speed recommendation system 170 discussed above. In the training phase, training module 260 clusters historical speed-tracking-error data 280 from a plurality of drivers into a plurality of driver types 310(1), 310(2), . . . 310($n$). In some embodiments, training module 260 performs clustering by employing hierarchical cluster analysis (HCA). Training module 260 also identifies one or more principal variables in the clustered historical speed-tracking-error data. In some embodiments, training module 260 employs principal component analysis (PCA) to identify the one or more principal variables. Training module 260 also trains, for each driver type 310($i$) in the plurality of driver types, 310(1), 310(2), . . . , 310($n$), a corresponding NAR neural network 325($i$) using the clustered historical speed-tracking-error data and the one or more identified principal variables. As discussed above, in some embodiments, a different type of neural network may be employed.

FIG. 1 will now be discussed in full detail as an example vehicle environment within which the systems and methods disclosed herein may be implemented. The vehicle 100 can include one or more processors 110. In one or more arrangements, the one or more processors 110 can be a main processor of the vehicle 100. For instance, the one or more processors 110 can be an electronic control unit (ECU). The vehicle 100 can include one or more data stores 115 for storing one or more types of data. The data store(s) 115 can include volatile and/or non-volatile memory. Examples of suitable data stores 115 include RAM, flash memory, ROM, PROM (Programmable Read-Only Memory), EPROM, EEPROM (Electrically Erasable Programmable Read-Only Memory), registers, magnetic disks, optical disks, hard drives, or any other suitable storage medium, or any combination thereof. The data store(s) 115 can be a component(s) of the one or more processors 110, or the data store(s) 115 can be operatively connected to the one or more processors 110 for use thereby. The term "operatively connected," as used throughout this description, can include direct or indirect connections, including connections without direct physical contact.

In one or more arrangements, the one or more data stores 115 can include map data 116. The map data 116 can include maps of one or more geographic areas. In some instances, the map data 116 can include information or data on roads, traffic control devices, road markings, structures, features, and/or landmarks in the one or more geographic areas. In one or more arrangement, the map data 116 can include one or more terrain maps 117. The terrain map(s) 117 can include information about the ground, terrain, roads, surfaces, and/or other features of one or more geographic areas. In one or more arrangement, the map data 116 can include one or more static obstacle maps 118. The static obstacle map(s) 118 can include information about one or more static obstacles located within one or more geographic areas.

The one or more data stores 115 can include sensor data 119. In this context, "sensor data" means any information about the sensors that a vehicle is equipped with, including the capabilities and other information about such sensors. As will be explained below, the vehicle 100 can include the sensor system 120. The sensor data 119 can relate to one or more sensors of the sensor system 120. As an example, in one or more arrangements, the sensor data 119 can include information on one or more LIDAR sensors 124 of the sensor system 120. As discussed above, in some embodiments, vehicle 100 can receive sensor data from other connected vehicles, from devices associated with other road users (ORUs), or both.

As noted above, the vehicle 100 can include the sensor system 120. The sensor system 120 can include one or more sensors. "Sensor" means any device, component and/or system that can detect, and/or sense something. The one or more sensors can be configured to detect, and/or sense in real-time. As used herein, the term "real-time" means a level of processing responsiveness that a user or system senses as sufficiently immediate for a particular process or determination to be made, or that enables the processor to keep up with some external process.

In arrangements in which the sensor system 120 includes a plurality of sensors, the sensors can function independently from each other. Alternatively, two or more of the sensors can work in combination with each other. In such a case, the two or more sensors can form a sensor network. The sensor system 120 and/or the one or more sensors can be operatively connected to the one or more processors 110, the data store(s) 115, and/or another element of the vehicle 100 (including any of the elements shown in FIG. 1).

The sensor system 120 can include any suitable type of sensor. Various examples of different types of sensors will be described herein. However, it will be understood that the implementations are not limited to the particular sensors described. The sensor system 120 can include one or more vehicle sensors 121. The vehicle sensors 121 can detect, determine, and/or sense information about the vehicle 100 itself, including the operational status of various vehicle components and systems.

In one or more arrangements, the vehicle sensors 121 can be configured to detect, and/or sense position and/or orientation changes of the vehicle 100, such as, for example, based on inertial acceleration. In one or more arrangements, the vehicle sensors 121 can include one or more accelerometers, one or more gyroscopes, an inertial measurement unit (IMU), a dead-reckoning system, a global navigation satellite system (GNSS), a navigation system 147, and/or other suitable sensors. The vehicle sensors 121 can be configured to detect, and/or sense one or more characteristics of the vehicle 100. In one or more arrangements, the vehicle sensors 121 can include a speedometer to determine a current speed of the vehicle 100.

Alternatively, or in addition, the sensor system 120 can include one or more environment sensors 122 configured to acquire, and/or sense driving environment data. "Driving environment data" includes any data or information about the external environment in which a vehicle is located or one or more portions thereof. For example, the one or more environment sensors 122 can be configured to detect, quantify, and/or sense obstacles in at least a portion of the external environment of the vehicle 100 and/or information/data about such obstacles. The one or more environment sensors 122 can be configured to detect, measure, quantify, and/or sense other things in at least a portion the external environment of the vehicle 100, such as, for example, nearby vehicles, lane markers, signs, traffic lights, traffic signs, lane lines, crosswalks, curbs proximate the vehicle 100, off-road objects, etc.

Various examples of sensors of the sensor system 120 will be described herein. The example sensors may be part of the one or more environment sensors 122 and/or the one or more vehicle sensors 121. Moreover, the sensor system 120 can include operator sensors that function to track or otherwise monitor aspects related to the driver/operator of the vehicle 100. However, it will be understood that the implementations are not limited to the particular sensors described. As an example, in one or more arrangements, the sensor system 120 can include one or more radar sensors 123, one or more LIDAR sensors 124, one or more sonar sensors 125, and/or one or more cameras 126.

The vehicle 100 can further include a communication system 130. The communication system 130 can include one or more components configured to facilitate communication between the vehicle 100 and one or more communication sources. Communication sources, as used herein, refers to people or devices with which the vehicle 100 can communicate with, such as external networks, computing devices, operator or occupants of the vehicle 100, or others. As part of the communication system 130, the vehicle 100 can include an input system 131. An "input system" includes any device, component, system, element or arrangement or groups thereof that enable information/data to be entered into a machine. In one or more examples, the input system 131 can receive an input from a vehicle occupant (e.g., a driver or a passenger). The vehicle 100 can include an output system 132. An "output system" includes any device, component, or arrangement or groups thereof that enable information/data to be presented to the one or more communication sources (e.g., a person, a vehicle passenger, etc.). The communication system 130 can further include specific elements which are part of or can interact with the input system 131 or the output system 132, such as one or more display device(s) 133, and one or more audio device(s) 134 (e.g., speakers and microphones).

The vehicle 100 can include one or more vehicle systems 140. Various examples of the one or more vehicle systems 140 are shown in FIG. 1. However, the vehicle 100 can include more, fewer, or different vehicle systems. It should be appreciated that although particular vehicle systems are separately defined, each or any of the systems or portions thereof may be otherwise combined or segregated via hardware and/or software within the vehicle 100. The vehicle 100 can include a propulsion system 141, a braking system 142, a steering system 143, throttle system 144, a transmission system 145, a signaling system 146, and/or a navigation system 147. Each of these systems can include one or more devices, components, and/or combinations thereof, now known or later developed.

The one or more processors 110 can be operatively connected to communicate with the various vehicle systems 140 and/or individual components thereof. For example, returning to FIG. 1, the one or more processors 110 can be in communication to send and/or receive information from the various vehicle systems 140 to control the movement, speed, maneuvering, heading, direction, etc. of the vehicle 100. The one or more processors 110 may control some or all of these vehicle systems 140.

The vehicle 100 can include one or more modules, at least some of which are described herein. The modules can be implemented as computer-readable program code that, when executed by a processor 110, implement one or more of the various processes described herein. The processor 110 can be a device, such as a CPU, which is capable of receiving and executing one or more threads of instructions for the purpose of performing a task. One or more of the modules can be a component of the one or more processors 110, or one or more of the modules can be executed on and/or distributed among other processing systems to which the one or more processors 110 is operatively connected. The modules can include instructions (e.g., program logic) executable by one or more processors 110. Alternatively, or in addition, one or more data store 115 may contain such instructions.

In one or more arrangements, one or more of the modules described herein can include artificial or computational intelligence elements, e.g., neural network, fuzzy logic or other machine learning algorithms. Further, in one or more arrangements, one or more of the modules can be distributed among a plurality of the modules described herein. In one or more arrangements, two or more of the modules described herein can be combined into a single module.

Detailed implementations are disclosed herein. However, it is to be understood that the disclosed implementations are intended only as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various implementations are shown in FIGS. 1-5, but the implementations are not limited to the illustrated structure or application.

The flowcharts and block diagrams in the figures illustrate the architecture, functionality, and operation of possible implementations of systems, methods, and computer program products according to various implementations. In this regard, each block in the flowcharts or block diagrams can represent a module, segment, or portion of code, which comprises one or more executable instructions for implementing the specified logical function(s). It should also be noted that, in some alternative implementations, the functions noted in the block can occur out of the order noted in the figures. For example, two blocks shown in succession can be executed substantially concurrently, or the blocks can sometimes be executed in the reverse order, depending upon the functionality involved.

The systems, components and/or methods described above can be realized in hardware or a combination of hardware and software and can be realized in a centralized fashion in one processing system or in a distributed fashion where different elements are spread across several interconnected processing systems. Any kind of processing system or other apparatus adapted for carrying out the methods described herein is suited. A typical combination of hardware and software can be a processing system with computer-usable program code that, when being loaded and executed, controls the processing system such that it carries out the methods described herein. The systems, components and/or methods also can be embedded in a computer-readable storage, such as a computer program product or other data programs storage device, readable by a machine, tangibly embodying a program of instructions executable by the machine to perform methods and methods described herein. These elements also can be embedded in an application product which comprises all the features enabling the implementation of the methods described herein and, which when loaded in a processing system, is able to carry out these methods.

Furthermore, arrangements described herein can take the form of a computer program product embodied in one or more computer-readable media having computer-readable program code embodied or embedded, such as stored thereon. Any combination of one or more computer-readable media can be utilized. The computer-readable medium can be a computer-readable signal medium or a computer-readable storage medium. The phrase "computer-readable storage medium" means a non-transitory storage medium. A computer-readable storage medium can be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: an electrical connection having one or more wires, a portable computer diskette, a hard disk drive (HDD), a solid state drive (SSD), a RAM, a ROM, an EPROM or Flash memory, an optical fiber, a portable compact disc read-only memory (CD-ROM), a digital versatile disc (DVD), an optical storage device, a magnetic storage device, or any suitable combination of the foregoing. In the context of this document, a computer-readable storage medium can be any tangible medium that can contain, or store a program for use by, or in connection with, an instruction execution system, apparatus, or device.

Program code embodied on a computer-readable medium can be transmitted using any appropriate medium, including but not limited to wireless, wireline, optical fiber, cable, RF, etc., or any suitable combination of the foregoing. Computer program code for carrying out operations for aspects of the present arrangements can be written in any combination of one or more programming languages, including an object-oriented programming language such as Java™ Smalltalk, C++ or the like and conventional procedural programming languages, such as the "C" programming language or similar programming languages. The program code can execute entirely on the user's computer, partly on the user's computer, as a stand-alone software package, partly on the user's computer and partly on a remote computer, or entirely on the remote computer or server. In the latter scenario, the remote computer can be connected to the user's computer through any type of network, including a LAN or a WAN, or the connection can be made to an external computer (for example, through the Internet using an Internet Service Provider).

In the description above, certain specific details are outlined in order to provide a thorough understanding of various implementations. However, one skilled in the art will understand that the invention may be practiced without these details. In other instances, well-known structures have not been shown or described in detail to avoid unnecessarily obscuring descriptions of the implementations. Unless the context requires otherwise, throughout the specification and claims which follow, the word "comprise" and variations thereof, such as, "comprises" and "comprising" are to be construed in an open, inclusive sense, that is, as "including, but not limited to." Further, headings provided herein are for convenience only and do not interpret the scope or meaning of the claimed invention.

Reference throughout this specification to "one or more implementations" or "an implementation" means that a particular feature, structure or characteristic described in connection with the implementation is included in at least one or more implementations. Thus, the appearances of the phrases "in one or more implementations" or "in an implementation" in various places throughout this specification are not necessarily all referring to the same implementation. Furthermore, the particular features, structures, or characteristics may be combined in any suitable manner in one or more implementations. Also, as used in this specification and the appended claims, the singular forms "a," "an," and "the" include plural referents unless the content clearly dictates otherwise. It should also be noted that the term "or" is generally employed in its sense including "and/or" unless the content clearly dictates otherwise.

The headings (such as "Background" and "Summary") and sub-headings used herein are intended only for general organization of topics within the present disclosure and are not intended to limit the disclosure of the technology or any aspect thereof. The recitation of multiple implementations having stated features is not intended to exclude other implementations having additional features, or other implementations incorporating different combinations of the stated features. As used herein, the terms "comprise" and "include" and their variants are intended to be non-limiting, such that recitation of items in succession or a list is not to the exclusion of other like items that may also be useful in the devices and methods of this technology. Similarly, the terms "can" and "may" and their variants are intended to be non-limiting, such that recitation that an implementation can or may comprise certain elements or features does not exclude other implementations of the present technology that do not contain those elements or features.

The broad teachings of the present disclosure can be implemented in a variety of forms. Therefore, while this disclosure includes particular examples, the true scope of the disclosure should not be so limited since other modifications will become apparent to the skilled practitioner upon a study of the specification and the following claims. Reference herein to one aspect, or various aspects means that a particular feature, structure, or characteristic described in connection with an implementation or particular system is included in at least one or more implementations or aspect. The appearances of the phrase "in one aspect" (or variations thereof) are not necessarily referring to the same aspect or implementation. It should also be understood that the various method steps discussed herein do not have to be carried out in the same order as depicted, and not each method step is required in each aspect or implementation.

Generally, "module," as used herein, includes routines, programs, objects, components, data structures, and so on that perform particular tasks or implement particular data types. In further aspects, a memory generally stores the noted modules. The memory associated with a module may be a buffer or cache embedded within a processor, a RAM, a ROM, a flash memory, or another suitable electronic storage medium. In still further aspects, a module as envisioned by the present disclosure is implemented as an application-specific integrated circuit (ASIC), a hardware component of a system on a chip (SoC), as a programmable logic array (PLA), or as another suitable hardware component that is embedded with a defined configuration set (e.g., instructions) for performing the disclosed functions.

The terms "a" and "an," as used herein, are defined as one as or more than one. The term "plurality," as used herein, is defined as two or more than two. The term "another," as used herein, is defined as at least a second or more. The terms "including" and/or "having," as used herein, are defined as including (i.e., open language). The phrase "at least one of . . . and . . . " as used herein refers to and encompasses any and all possible combinations of one or more of the associated listed items. As an example, the phrase "at least one of A, B and C" includes A only, B only, C only, or any combination thereof (e.g., AB, AC, BC or ABC).

The preceding description of the implementations has been provided for purposes of illustration and description. It is not intended to be exhaustive or to limit the disclosure. Individual elements or features of a particular implementation are generally not limited to that particular implementation, but, where applicable, are interchangeable and can be used in a selected implementation, even if not specifically shown or described. The same may also be varied in many ways. Such variations should not be regarded as a departure from the disclosure, and all such modifications are intended to be included within the scope of the disclosure.

While the preceding is directed to implementations of the disclosed devices, systems, and methods, other and further implementations of the disclosed devices, systems, and methods can be devised without departing from the basic scope thereof. The scope thereof is determined by the claims that follow.

What is claimed is:

1. A system for compensating for driver speed-tracking error, the system comprising:
   one or more processors; and
   a memory communicably coupled to the one or more processors and storing:
   a motion control module including instructions that when executed by the one or more processors cause the one or more processors to compute a recommended speed for a vehicle;
   a driver-classification module including instructions that when executed by the one or more processors cause the one or more processors to classify a driver of the vehicle as a particular type of driver among a plurality of driver types based on measured speed-tracking error, wherein the speed-tracking error is a difference between the recommended speed and an actual speed of the vehicle;
   a speed-tracking-error prediction and compensation module including instructions that when executed by the one or more processors cause the one or more processors to:
   predict the speed-tracking error at a future time increment based on the speed-tracking error at one or more past time increments using a nonlinear autoregressive (NAR) neural network associated with the particular type of driver; and
   compute a compensated recommended speed for the vehicle based on the recommended speed and the predicted speed-tracking error at the future time increment; and
   a human-machine interface (HMI) module including instructions that when executed by the one or more processors cause the one or more processors to communicate the compensated recommended speed to the driver.

2. The system of claim 1, further comprising a training module including instructions that when executed by the one or more processors cause the one or more processors to:
   cluster historical speed-tracking-error data from a plurality of drivers into the plurality of driver types;

identify one or more principal variables in the clustered historical speed-tracking-error data; and train, for each driver type in the plurality of driver types, a corresponding NAR neural network using the clustered historical speed-tracking-error data and the one or more principal variables.

3. The system of claim 1, wherein the plurality of driver types correspond to varying degrees of accuracy in tracking a recommended speed.

4. The system of claim 1, wherein the motion control module includes instructions to compute the recommended speed for the vehicle based, at least in part, on information received from one or more of a traffic information server and another vehicle.

5. The system of claim 1, wherein the instructions in the HMI module to communicate the compensated recommended speed to the driver include instructions to display the compensated recommended speed.

6. The system of claim 5, wherein the HMI module includes further instructions to display the actual speed of the vehicle.

7. The system of claim 1, wherein the instructions in the HMI module include instructions to communicate the compensated recommended speed to the driver audibly.

8. A non-transitory computer-readable medium for compensating for driver speed-tracking error and storing instructions that when executed by one or more processors cause the one or more processors to:

compute a recommended speed for a vehicle;

classify a driver of the vehicle as a particular type of driver among a plurality of driver types based on measured speed-tracking error, wherein the speed-tracking error is a difference between the recommended speed and an actual speed of the vehicle;

predict the speed-tracking error at a future time increment based on the speed-tracking error at one or more past time increments using a nonlinear autoregressive (NAR) neural network associated with the particular type of driver;

compute a compensated recommended speed for the vehicle based on the recommended speed and the predicted speed-tracking error at the future time increment; and communicate the compensated recommended speed to the driver.

9. The non-transitory computer-readable medium of claim 8, wherein the instructions include further instructions that when executed by one or more processors cause the one or more processors to:

cluster historical speed-tracking-error data from a plurality of drivers into the plurality of driver types;

identify one or more principal variables in the clustered historical speed-tracking-error data; and train, for each driver type in the plurality of driver types, a corresponding NAR neural network using the clustered historical speed-tracking-error data and the one or more principal variables.

10. The non-transitory computer-readable medium of claim 8, wherein the plurality of driver types correspond to varying degrees of accuracy in tracking a recommended speed.

11. The non-transitory computer-readable medium of claim 8, wherein the instructions include instructions to compute the recommended speed for the vehicle based, at least in part, on information received from one or more of a traffic information server and another vehicle.

12. The non-transitory computer-readable medium of claim 8, wherein the instructions to communicate the compensated recommended speed to the driver include instructions to display the compensated recommended speed.

13. The non-transitory computer-readable medium of claim 12, wherein the instructions include further instructions to display the actual speed of the vehicle.

14. A method of compensating for driver speed-tracking error, the method comprising:

computing a recommended speed for a vehicle;

classifying a driver of the vehicle as a particular type of driver among a plurality of driver types based on measured speed-tracking error, wherein the speed-tracking error is a difference between the recommended speed and an actual speed of the vehicle;

predicting the speed-tracking error at a future time increment based on the speed-tracking error at one or more past time increments using a nonlinear autoregressive (NAR) neural network associated with the particular type of driver;

computing a compensated recommended speed for the vehicle based on the recommended speed and the predicted speed-tracking error at the future time increment; and communicating the compensated recommended speed to the driver.

15. The method of claim 14, further comprising:

clustering historical speed-tracking-error data from a plurality of drivers into the plurality of driver types;

identifying one or more principal variables in the clustered historical speed-tracking-error data; and training, for each driver type in the plurality of driver types, a corresponding NAR neural network using the clustered historical speed-tracking-error data and the one or more principal variables.

16. The method of claim 14, wherein the plurality of driver types correspond to varying degrees of accuracy in tracking a recommended speed.

17. The method of claim 14, wherein computing the recommended speed for the vehicle is based, at least in part, on information received from one or more of a traffic information server and another vehicle.

18. The method of claim 14, wherein communicating the compensated recommended speed to the driver includes displaying the compensated recommended speed.

19. The method of claim 18, further comprising displaying the actual speed of the vehicle.

20. The method of claim 14, wherein communicating the compensated recommended speed to the driver is performed audibly.

* * * * *